(12) United States Patent
Weiss et al.

(10) Patent No.: US 11,724,960 B2
(45) Date of Patent: Aug. 15, 2023

(54) GLASS CERAMIC WITH REDUCED LITHIUM CONTENT

(71) Applicant: SCHOTT AG, Mainz (DE)

(72) Inventors: Evelin Weiss, Mainz (DE); Meike Schneider, Taunusstein (DE); Oliver Hochrein, Mainz (DE); Friedrich Siebers, Nierstein (DE); Roland Dudek, Bad Kreuznach (DE); Martin Mueller, Darmstadt (DE); Matthias Bockmeyer, Mainz (DE); Birgit Doerk, Mainz (DE)

(73) Assignee: SCHOTT AG, Mainz (DE)

(*) Notice: Subject to any disclaimer, the term of this patent is extended or adjusted under 35 U.S.C. 154(b) by 105 days.

(21) Appl. No.: 17/354,560

(22) Filed: Jun. 22, 2021

(65) Prior Publication Data

US 2021/0317033 A1 Oct. 14, 2021

Related U.S. Application Data

(63) Continuation of application No. 16/226,707, filed on Dec. 20, 2018, now Pat. No. 11,072,557.

(30) Foreign Application Priority Data

Dec. 22, 2017 (DE) .......................... 102017131067.3
May 7, 2018 (DE) .......................... 102018110855.9

(51) Int. Cl.
*C03C 10/14* (2006.01)
*C03B 32/02* (2006.01)
(Continued)

(52) U.S. Cl.
CPC .......... *C03C 10/0027* (2013.01); *C03C 3/087* (2013.01); *C03C 3/097* (2013.01);
(Continued)

(58) Field of Classification Search
CPC .................................................. C03C 10/0027
See application file for complete search history.

(56) References Cited

U.S. PATENT DOCUMENTS

| 3,756,798 A | 9/1973 | Ernsberger |
| 3,788,865 A | 1/1974 | Babcock |

(Continued)

FOREIGN PATENT DOCUMENTS

| CN | 1326903 | 12/2001 |
| CN | 1332127 | 1/2002 |

(Continued)

OTHER PUBLICATIONS

Le Bourhis, "Glass Mechanics and Technology", Wiley-VCH GmbH & Co. KGaA, 3 pages.
(Continued)

*Primary Examiner* — Karl E Group
(74) *Attorney, Agent, or Firm* — Ruggiero McAllister & McMahon LLC (57) ABSTRACT

A transparent colored glass ceramic, in particular an LAS glass ceramic, suitable for use as a cooking surface is provided. The transparent colored glass ceramic includes high-quartz solid solution (HQ s.s.) as a main crystal phase and exhibits thermal expansion of −1 to +1 ppm/K in the range from 20° C. to 700° C. The glass ceramic has from 3.0 to 3.6 percent by weight of lithium oxide ($Li_2O$) as constituents and either is colored with 0.003 to 0.05 percent by weight of vanadium oxide ($V_2O_5$) or is colored with 0.003 to 0.25 percent by weight of molybdenum oxide ($MoO_3$).

19 Claims, 1 Drawing Sheet

(51) Int. Cl.
  *C03C 10/00* (2006.01)
  *F24C 15/10* (2006.01)
  *C03C 3/097* (2006.01)
  *C03C 3/087* (2006.01)
  *C03C 4/02* (2006.01)
  *F24B 1/192* (2006.01)
  *F24C 15/04* (2006.01)

(52) U.S. Cl.
  CPC .............. *C03C 4/02* (2013.01); *C03C 10/00* (2013.01); *C03C 10/0009* (2013.01); *C03C 10/0036* (2013.01); *C03C 10/0054* (2013.01); *F24C 15/10* (2013.01); *F24B 1/192* (2013.01); *F24C 15/04* (2013.01)

(56) References Cited

U.S. PATENT DOCUMENTS

| | | |
|---|---|---|
| 4,273,586 A | 6/1981 | Flannery |
| 4,285,728 A | 8/1981 | Babcock |
| 4,455,160 A | 6/1984 | Rittler |
| 4,461,839 A | 7/1984 | Rittler |
| 4,526,872 A | 7/1985 | Andrieu |
| 4,835,121 A | 5/1989 | Shibuya |
| 5,010,041 A | 4/1991 | Koyama |
| 5,179,045 A | 1/1993 | Aitken |
| 5,204,293 A | 4/1993 | Amundson, Jr. |
| 5,212,122 A | 5/1993 | Pannhorst |
| 5,256,600 A | 10/1993 | Pfitzenmaier |
| 5,446,008 A | 8/1995 | Krolla |
| 5,491,115 A | 2/1996 | Pfitzenmaier |
| 6,413,906 B1 | 7/2002 | Shimatani |
| 8,198,201 B2 | 6/2012 | Comte |
| 8,722,554 B2 | 5/2014 | Comte |
| 8,765,619 B2 | 7/2014 | Brunet |
| 9,018,113 B2 | 4/2015 | Siebers |
| 9,061,937 B2 | 6/2015 | Siebers |
| 9,156,727 B2 | 10/2015 | Siebers |
| 10,562,807 B2 | 2/2020 | Siebers |
| 2002/0011481 A1 | 1/2002 | Melson |
| 2002/0023463 A1 | 2/2002 | Siebers |
| 2003/0054935 A1 | 3/2003 | Kitamura |
| 2003/0218001 A1 | 11/2003 | Siebers |
| 2004/0198579 A1 | 10/2004 | Horsfall |
| 2005/0252503 A1 | 11/2005 | Siebers |
| 2007/0004578 A1 | 1/2007 | Comte |
| 2007/0056961 A1 | 3/2007 | Shimatani |
| 2007/0108184 A1 | 5/2007 | Imamoto |
| 2007/0129231 A1 | 6/2007 | Comte |
| 2007/0232476 A1 | 10/2007 | Siebers |
| 2007/0259767 A1 | 11/2007 | Siebers |
| 2007/0293386 A1 | 12/2007 | Goto |
| 2008/0026927 A1 | 1/2008 | Comte |
| 2008/0090034 A1 | 4/2008 | Harrison |
| 2008/0139375 A1 | 6/2008 | Wennemann |
| 2008/0184740 A1 | 8/2008 | Waldschmidt |
| 2008/0207424 A1 | 8/2008 | Aitken |
| 2009/0018007 A1 | 1/2009 | Siebers |
| 2009/0109373 A1 | 4/2009 | Taniguchi |
| 2010/0047556 A1 | 2/2010 | Bockmeyer |
| 2010/0099546 A1 | 4/2010 | Aitken |
| 2010/0130034 A1 | 5/2010 | Huang |
| 2010/0157585 A1 | 6/2010 | Diekmann |
| 2010/0167903 A1 | 7/2010 | Comte |
| 2010/0224619 A1 | 9/2010 | Schoenberger |
| 2010/0304944 A1 | 12/2010 | Comte |
| 2011/0140843 A1 | 6/2011 | Nireki |
| 2011/0226231 A1 | 9/2011 | Siebers |
| 2012/0067865 A1 | 3/2012 | Siebers |
| 2012/0085336 A1 | 4/2012 | Brunet |
| 2013/0070451 A1 | 3/2013 | Mulet |
| 2013/0098903 A1 | 4/2013 | Di Giovanni |
| 2013/0130887 A1 | 5/2013 | Nakane |
| 2013/0164509 A1 | 6/2013 | Siebers |
| 2013/0178353 A1 | 7/2013 | Comte |
| 2013/0201678 A1 | 8/2013 | Siebers |
| 2013/0225388 A1 | 8/2013 | Nakane |
| 2013/0286630 A1 | 10/2013 | Guiset |
| 2013/0328946 A1 | 12/2013 | Zenker |
| 2014/0009370 A1 | 1/2014 | Weiss |
| 2014/0146530 A1 | 5/2014 | Guiset |
| 2014/0146538 A1 | 5/2014 | Zenker |
| 2014/0194270 A1 | 7/2014 | Shiratori |
| 2014/0238971 A1 | 8/2014 | Comte |
| 2014/0356608 A1 | 12/2014 | Lentes |
| 2015/0239771 A1 | 8/2015 | Siebers |
| 2015/0266770 A1 | 9/2015 | Miyasaka |
| 2015/0266771 A1 | 9/2015 | Miyasaka |
| 2015/0274579 A1 | 10/2015 | Plevacova |
| 2016/0031755 A1 | 2/2016 | Hoppe |
| 2016/0168018 A1 | 6/2016 | Gabel |
| 2016/0176752 A1 | 6/2016 | Gabel |
| 2016/0281961 A1 | 9/2016 | Laluet |
| 2016/0334094 A1 | 11/2016 | Bach |
| 2017/0016627 A1 | 1/2017 | Charpentier |
| 2017/0023260 A1 | 1/2017 | Charpentier |
| 2017/0052311 A1 | 2/2017 | Lautenschlager |
| 2017/0139109 A1 | 5/2017 | Gierens |
| 2017/0205552 A1 | 7/2017 | Gierens |
| 2017/0215236 A1 | 7/2017 | Doerk |
| 2019/0059131 A1 | 2/2019 | Debreyer |
| 2019/0062201 A1 | 2/2019 | Weiss |
| 2019/0194054 A1 | 6/2019 | Siebers |
| 2019/0194060 A1 | 6/2019 | Weiss |
| 2019/0194061 A1 | 6/2019 | Weiss |
| 2019/0194062 A1 | 6/2019 | Woelfinger |
| 2019/0194065 A1 | 6/2019 | Henn |
| 2019/0246788 A1 | 8/2019 | Demol |
| 2019/0315652 A1 | 10/2019 | Siebers |
| 2020/0048144 A1 | 2/2020 | Guedon |

FOREIGN PATENT DOCUMENTS

| | | |
|---|---|---|
| CN | 1696072 | 11/2005 |
| CN | 1784363 | 6/2006 |
| CN | 1871179 | 11/2006 |
| CN | 101085699 | 12/2007 |
| CN | 101657390 | 2/2010 |
| DE | 1796298 | 5/1972 |
| DE | 2705948 | 9/1977 |
| DE | 2844030 | 4/1979 |
| DE | 3345316 | 6/1984 |
| DE | 3927174 | 2/1990 |
| DE | 19939787 | 2/2001 |
| DE | 10338165 | 3/2005 |
| DE | 102007036407 | 9/2008 |
| DE | 102008031428 | 1/2010 |
| DE | 102008040097 | 1/2010 |
| DE | 102008050263 | 4/2010 |
| DE | 102009013127 | 9/2010 |
| DE | 102009011850 | 11/2010 |
| DE | 102011050873 | 6/2012 |
| DE | 202011110029 | 10/2012 |
| DE | 102014226986 | 6/2016 |
| DE | 102015103461 | 9/2016 |
| DE | 102016101036 | 7/2017 |
| DE | 102017101114 | 7/2017 |
| DE | 102016103524 | 8/2017 |
| DE | 102016211065 | 12/2017 |
| DE | 202018100558 | 2/2018 |
| EP | 0220333 | 5/1987 |
| EP | 1074520 | 2/2001 |
| EP | 1313675 | 5/2003 |
| EP | 1465460 | 10/2004 |
| EP | 1398303 | 11/2005 |
| EP | 1837312 | 9/2007 |
| EP | 2435378 | 7/2014 |
| EP | 2817265 | 12/2014 |
| EP | 3208545 | 8/2017 |
| EP | 3049374 | 11/2017 |
| EP | 3502072 | 6/2019 |
| FR | 2909373 | 6/2008 |
| FR | 3002532 | 8/2014 |
| GB | 1562332 | 3/1980 |

(56) References Cited

FOREIGN PATENT DOCUMENTS

| | | |
|---|---|---|
| GB | 2430249 | 2/2009 |
| JP | H0551235 | 3/1993 |
| JP | H11100229 | 4/1999 |
| JP | H11100230 | 4/1999 |
| JP | H11100231 | 4/1999 |
| JP | 2004251615 | 9/2004 |
| JP | 2006252808 | 9/2006 |
| JP | 6086311 | 3/2017 |
| WO | 0216279 | 2/2002 |
| WO | 2010013700 | 2/2010 |
| WO | 2010102859 | 9/2010 |
| WO | 2010137000 | 12/2010 |
| WO | 2011089220 | 7/2011 |
| WO | 2012010278 | 1/2012 |
| WO | 2012076412 | 6/2012 |
| WO | 2012076414 | 6/2012 |
| WO | 2012168011 | 12/2012 |
| WO | 2013124240 | 8/2013 |
| WO | 2014170275 | 10/2014 |
| WO | 2018224554 | 12/2018 |
| WO | 2018224556 | 12/2018 |

OTHER PUBLICATIONS

"Schott Technical Glasses", Schott AG, Mainz, Germany, Oct. 2007, 40 Pages.

Glass Ceramic transmission: Schott Nextrema optical properties, Schott North America, 2020, 3 pages.

ISO 7991, "Glass—Determination of coefficient of mean linear thermal expansion", Dec. 15, 1987, 12 pages.

DIN 52324 (replaced by DIN ISO 7884-8), "Glass—Viscosity and viscometric fixed points—Part 8: Determination of (dilatometric) transformation temperature", Feb. 1998, 7 pages.

ASTM D1003-13, "Standard Test Method for Haze and Luminous Transmittance of Transparent Plastics", Nov. 15, 2013, 7 pages.

DIN EN ISO 11664-4 "Colorimetry—4: Part CIE 1976 L*a*b* Colour space", Jun. 2012, 12 pages.

DIN ISO 7884-8, "Glass—Viscosity and viscometric fixed points—Part 8: Determination of (dilatometric) transfomnation temperature", Feb. 1998 (formerly DIN 52324).

D65 "Standard Illuminant Light", Wikipedia, Apr. 14, 2008.

English translation of DIN EN 410, "Glass in building-Determination of luminous and solar characteristics of glazing", Apr. 2011, 66 pages.

DIN EN ISO 11664-4 "Colorimetry—Part 4: CIE 1976 L*a*b* Colour space", Jun. 2012, 12 pages.

DIN ISO 7884-8, "Glass—Viscosity and viscometric fixed points—Part 8: Determination of (dilatometric) transformation temperature", Feb. 1998 (formerly DIN 52324).

Glass Ceramic transmission: Schott Nextrema optical properties, Schott North America, Oct. 2017.

Le Bourhis, "Glass Mechanics and Technology", Wiley-VCH GmbH & Co. KGaA, 2008.

"Schott Technical Glasses", Schott AG, Mainz, Germany, Oct. 2007.

Bach, Low Thermal Expansion Glass Ceramics:, Second Edition, Springer, 1995, pp. 81-103.

GLASS CERAMIC WITH REDUCED LITHIUM CONTENT

CROSS REFERENCE TO RELATED APPLICATIONS

This application is a continuation of U.S. application Ser. No. 16/226,707 filed Dec. 20, 2018, now U.S. Pat. No. 11,072,557, which claims benefit under 35 USC § 119 of German Application Nos. 10 2017 131 067.3 filed Dec. 22, 2017 and 10 2018 110 855.9 filed May 7, 2018, the entire contents of all of which are incorporated herein by reference.

BACKGROUND

1. Field of the Invention

The invention relates to a transparent colored glass ceramic which is suitable for use as a cooking surface.

2. Description of Related Art

Glass ceramic cooking surfaces and the glass ceramics used for this purpose have been known for many years. Usually, lithium aluminosilicate (LAS) glass ceramics are used, which comprise, as a main crystal phase, either high-quartz solid solution, in particular for transparent materials, or keatite solid solution, in particular for translucent or opaque materials. The characteristic of these materials that is crucial for use as a cooking surface is to exhibit very small thermal expansion in the range from room temperature to 700° C. and above, and this is achieved by a combination of crystal phases that exhibit negative thermal expansion with an amorphous residual glass phase exhibiting positive thermal expansion. To achieve this, the content in crystal phase must be sufficiently high, usually greater than 50%, preferably even greater than 60%. In the glass ceramics used hitherto, a lithium content of usually 4 to 5 percent by weight is employed for this purpose.

When transparent glass ceramics with high-quartz solid solution as the main crystal phase are used for cooktops, they are either dyed by adding coloring oxides or they are provided with an underside coating to visually hide the technical installations disposed below the cooking surface. There are different coloring oxides that may be used for dying the glass ceramic, some of which, such as CoO, NiO, $Nd_2O_3$, or CuO, can significantly increase the price of the glass ceramics, due to their high raw material costs. While the refining agents arsenic oxide and/or antimony oxide known from the glass industry were mostly used in the past, other less toxic alternatives such as tin oxide ($SnO_2$) are preferred as refining agents today, for reasons of environmental and occupational safety.

Transparent glass ceramics which can optionally be dyed using $V_2O_5$ are described in DE 1796298 A1. Here, the coloring oxides NiO and CoO are preferably used. Coloring exclusively with $V_2O_5$ is only disclosed in conjunction with ZnS, since red-colored glass ceramics are to be produced.

Coloring with $V_2O_5$, $Cr_2O_3$, and CoO or CuO is described in publications U.S. Pat. No. 4,526,872 A, JP 6086311 B4, and EP 2435378 B1.

Colored glass ceramics with low lithium content are disclosed in DE 3345316 A1 for the production of colored oven and furnace windows. When vanadium oxide is employed for coloring, at least 0.1 percent by weight is used here, like in German patent DE19939787 C2 and in European patent EP 1313675 B2 which disclose a glass ceramic for cooking surfaces that is dyed with $V_2O_5$ and refined with $SnO_2$.

Japanese patent applications JP 11100229 A and JP 11100230 A describe glass ceramics dyed with vanadium oxide, which are refined with $SnO_2$ and optionally with addition of Cl.

Ceramizable glasses for the production of glass ceramics, which may optionally be colored with $V_2O_5$, are also known from EP 1398303 B1. The compositions described therein are refined using $As_2O_3$ or $Sb_2O_3$.

Also disclosed has been the addition of 0.05 to 1 percent by weight of fluorine (US 2007/0004578 A1), and of 0.01 to 1 percent by weight of bromine (US 2008/0026927 A1) for promoting the refining with $SnO_2$. However, the addition of halides is disadvantageous, since they vaporize strongly at the melting temperature and may thereby form toxic compounds such as HF.

Refining using the combination of $SnO_2$ and $CeO_2$ and/or $MnO_2$ is described in U.S. application US 2007/129231 A. However, 0.7 to 1.5% of $CeO_2$ or $MnO_2$ are required for this. Since the raw material price of these two constituents is significantly higher than that of $SnO_2$, the economic benefits are however questionable.

DE 102008040097 B4 discloses the tinting of a glass ceramic using smaller amounts of $V_2O_5$ in a range from 0.003 to 0.7 percent by weight.

Also disclosed in the prior art are transparent glass ceramics exhibiting a specifically adjusted light transmittance at specific wavelengths, for example in DE 102008050263 B4 and DE 102009013127 B4. A combination of different coloring oxides with $V_2O_5$, such as CoO, $Nd_2O_3$, NiO, is preferably used for this purpose.

Glass ceramics with $V_2O_5$ as a coloring oxide and $Fe_2O_3$, NiO and MnO as co-colorants are disclosed in U.S. Pat. No. 8,765,619.

The combination of vanadium oxide with CoO for coloring glass ceramic cooking surfaces has also been proposed (WO 1013700 A1). Again, however, compared to the coloring with $V_2O_5$ without CoO addition, a higher batch price has to be expected.

A display arrangement comprising a glass ceramic which may contain from 100 to 2000 ppm of $V_2O_5$ and from 0.1 to 0.5 percent by weight of $SnO_2$ is described in U.S. document US 2013/070451 A. A reduction in $Li_2O$ is described in the example, however with a low BaO content of 0.8 percent by weight and a MgO content of 1.3 percent by weight, which is likely to lead to an expansion coefficient unfavorable for cooktop applications.

WO 11089220 A1 discloses high-quartz glass ceramics which are optimized especially with regard to the refining with $SnO_2$. Here, CoO is preferably used in addition to $V_2O_5$ as a co-colorant.

A glass ceramic for cooking surfaces containing $V_2O_5$ as a colorant and $SnO_2$ as a refining agent and a lithium content of 3.5 percent by weight is exemplified in U.S. application US 2013/098903 A. This glass ceramic has an $SiO_2$ content of 69.9 percent by weight. Such an $SiO_2$ content increases the melting temperature, with the result that higher energy costs arise for the melt.

Colored cooking surfaces with a lithium content from 1.5 to 4.2 percent by weight and $SnO_2$ refining are also proposed in PCT application WO 12010278 A1. Here, a combination of at least two coloring oxides is used.

U.S. Pat. No. 8,722,554 B discloses a $V_2O_5$-colored glass ceramic which is especially optimized for refining with $SnO_2$. For this purpose, compositions with a $Li_2O$ content of more than 3.7 percent by weight are mentioned by way of example.

SUMMARY

The object of the invention is to provide a transparent colored glass ceramic which has good green glass melting properties and which is cost-effective without thereby incurring restrictions in the utility properties. More particularly, the glass ceramic shall meet all requirements for use as a cooking surface, such as low thermal expansion, adequate chemical resistance, thermal shock resistance, and long-term temperature resistance, as well as adapted optical transmittance.

The transparent colored glass ceramic of the invention, in particular an LAS glass ceramic, comprises high-quartz solid solution (HQ s.s.) as the main crystal phase and exhibits a thermal expansion of −1 to +1 ppm/K, preferably −0.6 to +0.6 ppm/K, and more preferably −0.5 to +0.5 ppm/K in the range from 20° C. to 700° C. This ensures adequate thermal shock resistance.

The statement that the glass ceramic of the invention comprises high-quartz solid solution as the main crystal phase is understood to mean that the fraction of high-quartz solid solution as a crystal phase amounts to more than 50% of the total of crystal phases comprised.

In addition, the glass ceramic of the invention contains from 3.0 to 3.6 percent by weight of lithium oxide ($Li_2O$) as a constituent. This allows to reduce the manufacturing price of the glass ceramic. Furthermore, the glass ceramic according to the invention is colored dark, with 0.003 to 0.05 percent by weight of vanadium oxide ($V_2O_5$) as a coloring oxide, preferably with 0.026 to 0.033 percent by weight.

As an alternative to the constituent $V_2O_5$, 0.003 to 0.25 percent by weight of molybdenum oxide ($MoO_3$) is used as the coloring oxide. Molybdenum oxide ($MoO_3$) also allows for cost-effective manufacturing. However, vanadium oxide ($V_2O_5$) is a stronger colorant than molybdenum oxide ($MoO_3$). Therefore, less $V_2O_5$ than $MoO_3$ is required for an identical coloration, making the use of $V_2O_5$ more cost-efficient. However, molybdenum oxide exhibits a shallower transmittance profile in the visible range, which is advantageous for white light-emitting elements.

Since other coloring oxides such as CoO, NiO, $Nd_2O_3$, or CuO can significantly increase the price of the glass ceramics, due to their high raw material costs, the glass ceramic of the invention preferably uses only vanadium oxide ($V_2O_5$) or molybdenum oxide ($MoO_3$) for producing the coloration, and the aforementioned small amounts are sufficient for an adequate coloration.

The use of further coloring oxides is therefore usually not reasonable, for cost considerations. Moreover, the use of coloring oxides which have a very strong coloring effect, such as CoO, NiO, $Cr_2O_3$, or CuO, may cause problems with unwanted impurities or cross-contamination, since even small amounts have a significant influence on the resulting color. The amount of these coloring oxides should be limited to the amounts introduced by impurities. This corresponds to respective amounts of CoO, NiO, $Cr_2O_3$, CuO, or $Nd_2O_3$ between 0 and less than 0.01 percent by weight, and between 0 and less than 0.03 percent by weight for $MnO_2$.

Since a sufficient coloring effect can also be achieved with $V_2O_5$ or $MoO_3$ as the only coloring oxide, the use of the aforementioned coloring oxides can be dispensed with.

The lower $Li_2O$ content compared to conventional glass ceramics provides for a reduction in raw material costs, since the costs of lithium raw materials have increased significantly in recent years due to an increased demand, for example for lithium-ion batteries. For an economically attractive production of glass ceramics, especially for cooking surfaces, it is therefore advantageous to lower the amount of lithium required for this purpose.

However, a reduction of the $Li_2O$ content in a lithium aluminosilicate (LAS) glass ceramic may lead to a reduction in the crystal phase content and thus to an increase in thermal expansion.

This can be compensated for by adding magnesium oxide (MgO), preferably in an amount ranging from 0 up to less than 1 percent by weight.

More preferably, the glass ceramic contains from 0.3 to less than 1 percent by weight of MgO, most preferably not more than 0.77 percent by weight of MgO.

In a preferred embodiment, in order to further counteract an increase in thermal expansion, zinc oxide (ZnO) may be added in an amount ranging from 1.2 to 2.5 percent by weight. An addition of more than 2.5 percent by weight of ZnO will lead to the formation of gahnite as an undesirable ancillary phase.

However, a reduction in alkaline earth oxides may at the same time cause an undesirable increase of the melting temperature. This effect can be reduced by the advantageous addition of BaO in a range from 1.2 to 2.8 percent by weight.

Thus, the choice of the aforementioned optimum weight percentage ranges for MgO and a specific addition of ZnO and BaO can be used to adjust viscosity and reduce melting temperatures.

A low lithium content in combination with coloration using exclusively $V_2O_5$ or $MoO_3$ and preferably simultaneously reducing the MgO content to less than 1 percent by weight and the potential choice of optimum weight percentage ranges for BaO with a content of 1.2 to 2.8 percent by weight and the addition of zinc oxide (ZnO) in an amount ranging from 1.2 to 2.5 percent by weight lead to an optimization of melting temperature and thermal expansion and to a particularly cost-effective glass ceramic with particularly good utility properties.

In a particularly advantageous embodiment of the glass ceramic, the ratio of (BaO+ZnO)/MgO, given in percent by weight, is in a range from 2.2 to 35, preferably in the range from 4.5 to 15.

Preferably, the glass ceramic is refined with 0.1 to 0.6 percent by weight of tin oxide ($SnO_2$). $SnO_2$ contents of greater than 0.6 percent by weight adversely affect meltability and increase devitrification tendency. The use of tin oxide moreover allows to avoid using harmful refining agents.

A particularly preferred glass ceramic contains the following constituents, in percent by weight:

| | |
|---|---|
| $SiO_2$ | 62 to 68 |
| $Al_2O_3$ | 18.5 to 23 |
| $Li_2O$ | 3.0 to 3.6, preferably 3.2 to 3.6 |
| $V_2O_5$ | 0.03 to 0.05 or $MoO_3$ 0.003 to 0.25, |
| $SnO_2$ | 0.1 to 0.6 |
| BaO | 1.2 to 2.8 |
| MgO | 0 to less than 1, preferably 0.3 to less than 1 |
| ZnO | 1.2 to 2.5 |
| $TiO_2$ | 2.6 to 4.5 |
| $ZrO_2$ | 0.9 to 1.7 |
| $B_2O_3$ | 0 to 2 |
| $P_2O_5$ | 0 to 4 |
| $Na_2O + K_2O$ | 0 to less than 1.5, preferably to less than 1 |
| CaO | 0 to less than 1 |
| SrO | 0 to less than 1 |
| $Fe_2O_3$ | 0 to 0.2, preferably to 0.15. |

In the preferred glass ceramic, the listed constituents account for at least 96 percent by weight, typically at least 98 percent by weight of the total composition. In addition to the constituents mentioned, the glass ceramic may include impurities such as those commonly occurring in raw materials used on an industrial scale.

The constituents $SiO_2$ and $Al_2O_3$ together with the $Li_2O$ are the main constituents of the high-quartz solid solution crystal phase in the glass ceramic. At the same time, they essentially determine the glass formation properties and the viscosity of the green glass for the production of the glass ceramic. The content of $Al_2O_3$ preferably ranges from 18.5 to 23 percent by weight, while smaller amounts would result in an undesirable increase in viscosity. A higher $Al_2O_3$ content increases the devitrification tendency and promotes the undesirable formation of mullite.

The optimum range for $SiO_2$ is preferably between 62 and 68 percent by weight. Glass ceramics with a lower $SiO_2$ content may exhibit drawbacks in the utility properties important for cooking surfaces, such as chemical resistance and thermal resistance. In the case of green glasses with a higher $SiO_2$ content, on the other hand, the melting temperature increases, so that higher energy costs may result during the production of the glass ceramic.

$TiO_2$, $ZrO_2$, and the $SnO_2$ preferably used for refining are preferably effective as nucleation agents. In order to ensure effective nucleation even in case of short ceramization durations, the glass ceramic advantageously contains at least 2.6 percent by weight of $TiO_2$ and at least 0.9 percent by weight of $ZrO_2$. The upper limits of nucleation agent contents are derived from the requirements for devitrification stability and for avoiding unwanted foreign phases. High levels of $ZrO_2$ also lead to a significant increase in the melting temperatures that will be required. The total amount of nucleation agents should not exceed 6 percent by weight.

$B_2O_3$ and $P_2O_5$ can improve the meltability of the glass, but in large quantities they adversely affect thermal expansion and thermal resistance of the glass. In particular phosphorus can reduce the ceramization rate so that longer ceramization durations are required.

The alkali metal oxides $Na_2O$ and $K_2O$ are preferably used in small amounts, that is to say with not more than 1.5 percent by weight in total, preferably not more than 1 percent by weight, in order to lower the viscosity. Similarly, the use of CaO and/or SrO up to less than 1 percent by weight can be helpful. However, larger amounts of these oxides lead to the formation of foreign phases which increase thermal expansion inadmissibly.

Since a sufficient coloring effect can also be achieved with $V_2O_5$ or alternatively with $MoO_3$, the use of coloring oxides CoO, NiO, $Cr_2O_3$, CuO, $Nd_2O_3$, or $MnO_2$ should be dispensed with, as described above.

An exception can be $Fe_2O_3$ which may be included in amounts from 0 up to 0.2 percent by weight, preferably up to a maximum of 0.15 percent by weight, depending on the nature of the raw materials used. A small amount of $Fe_2O_3$ can aid in the refining process and allows the use of inexpensive raw materials. So, in combination with the aforementioned constituents in the aforementioned limits, it contributes to an improvement in meltability and quality as well as to cost reduction.

For reasons of environmental protection and occupational safety, the use of toxic or questionable raw materials is avoided if possible. Therefore, the glass ceramic is preferably free of environmentally harmful substances such as arsenic (As), antimony (Sb), cadmium (Cd), lead (Pb), cesium (Cs), rubidium (Rb), halides and sulfur (S), apart from unavoidable impurities in a range of preferably 0 to less than 0.5 percent by weight, more preferably less than 0.1 percent by weight, most preferably less than 0.05 percent by weight. The percentages by weight refer to the glass composition on an oxide basis.

Generally, either naturally occurring raw materials can be used, or chemically prepared or synthetically produced raw materials. Naturally occurring raw materials are generally less expensive than equivalent chemically prepared or synthesized raw materials. However, the utility of natural raw materials is limited due to the usually high levels of impurities. Examples of naturally occurring raw materials are quartz sand, spodumene, and petalite. Chemically prepared or synthetically produced raw materials generally contain very few impurities. Examples of common prepared or synthesized raw materials are lithium carbonate or titanium dioxide powder.

Depending on the constituent, certain limits should not be exceeded for such impurities. In addition to the constituents already mentioned above, in particular the content of $Cr_2O_3$ in the glass composition should be limited to less than 0.02 percent by weight, preferably to less than 0.01 percent by weight, more preferably of less than 0.005 percent by weight.

In a preferred embodiment, the statement that the glass ceramic comprises high-quartz solid solution (HQ s.s.) as the main crystal phase means that the fraction of high-quartz solid solution as a crystal phase amounts to more than 80%, preferably more than 90%, of the crystal phase content in total. Keatite solid solution and in particular Ti-, Zr-, or Sn-containing nucleation agent phases may be contained in small amounts, i.e. not more than 20% or preferably not more than 10% and most preferably not more than 5% of the crystal phases, if the requirements for thermal expansion are met.

However, the formation of other, in particular high-expansion crystal phases such as sodium or potassium aluminosilicates or silicates, is preferably avoided.

In preferred glass ceramics and with a thickness of 4 mm, light transmittance ($\tau_{vis}$) as measured in accordance with DIN EN 410 is from 0.5 to 70%, preferably from 0.5 to 40%, more preferably from 0.5 to 30%, most preferably from 0.5 to 20%. Depending on the use, ranges from 0.5 to 5% or even from 0.9 to 2% may be preferred as well.

This ensures that the technical components below the cooking surface are not perceived as disturbing by the viewer.

In order to achieve good visibility of display elements below the cooking surface, such as colored LEDs, the transmittance values are greater than 0.1%, preferably greater than 0.15% over the entire wavelength range above 450 nm.

The transmittance range from 0.5 to 10% is particularly important for the use of LED-based displays and light sources, such as 7-segment displays.

The transmittance range from 10 to 70%, preferably 30 to 40%, is particularly advantageous for the use of TFT displays.

So, these glass ceramics are particularly well suited for use with light-emitting display elements and other light-emitting elements. Examples include LEDs, 7-segment displays, TFT displays, in particular LCD and OLED TFT displays, or image or video projectors for projection through the glass ceramic. Such elements may be monochromatic or multicolored. Monochromatic elements that come into consideration in particular include red, green, blue or white elements. The multicolored elements include those that can display at least two primary colors at the same time as well as those that can display at least two colors in turn. Such light-emitting elements may also be provided in combination with scattering or diffuser elements attached to the glass ceramic. Scattering and diffuser elements are used for spatial homogenization of luminous intensity, for example, or for an enlargement of the viewing angle under which the luminous element can be perceived.

The $V_2O_5$-colored embodiments are particularly suitable for monochromatic red display and light-emitting elements, in particular red LEDs, red 7-segment displays, and red TFT displays. The $MoO_3$-colored embodiments are moreover particularly suitable for white and multicolored display and light-emitting elements, in particular white or RGB LEDs, white or RGB 7-segment displays, and color TFT displays or color projectors.

In the infrared, transmittance is high enough to ensure a good cooking behavior. Preferably, transmittance is from 45 to 85% at 1600 nm.

In a preferred embodiment, the green glass melt of the glass ceramic reaches a viscosity of 200 dPa·s at less than 1750° C., preferably at less than 1700° C.

Thermal expansion in the range from 20° C. to 700° C. preferably ranges from 0 to 0.41 ppm/K, more preferably from 0 to 0.35 ppm/K, most preferably from 0 to 0.3 ppm/K.

The glass ceramic is preferably used as a cooking surface, fireplace window, grill or roasting surface, cover of fuel elements in gas grills, oven door, especially for pyrolysis ovens, work surface or table top in kitchens or laboratories, cover for lighting devices, in fire-resistant glazing, and as safety glass, optionally in a laminate composite, and as a support plate or furnace lining in thermal processes, or as a back cover for mobile electronic devices.

The glass ceramic can be used in particular as a cooking surface with radiant heater, halogen heater, induction heating or with gas. The cooking surface may be provided with a decor on its upper and/or lower surface, entirely or partially. Also, touch sensors for operating the cooking surface may be provided on the underside. These may be capacitive sensors printed, glued or pressed thereon, for example.

Furthermore, the cooking surface may also be formed in three dimensions, that is, the panels may be angled or curved or may include a wok-shaped area, for example. Recesses are also possible, for example for the operation of gas burners.

The glass ceramic is preferably produced by the steps as follows. First, the batch raw materials and in addition preferably also broken glass is melted. Preferably, melting of the green glass is performed at temperatures of 1500 to 1700° C.

Refining of the green glass melt is preferably achieved using $SnO_2$.

For large-scale production, this is followed by a hot forming process, preferably rolling or floating, to produce glass ceramic panels. The shaping takes place in the range of the processing temperature, preferably at a viscosity of $10^4$ dPa·s. This temperature should preferably be less than 1350° C., more preferably less than 1330° C.

In order to avoid crystallization during the shaping, a margin between the processing temperature ($V_A$) and the upper devitrification temperature ($V_A$-OEG) should preferably be between 20 and 100° C.

Ceramization of the glass ceramic panels is preferably carried out in a two-stage ceramization process in which initially nucleation occurs at 680 to 800° C. Subsequently, the temperature is raised to 850 to 950° C. in order to grow the high-quartz solid solution (HMQK) on the seeds. For this purpose, temperatures are chosen high enough so that the fastest possible ceramization occurs, but without already having a conversion of high-quartz solid solution (HQ s.s.) into keatite solid solution (K s.s.). In the transition from high-quartz solid solution to keatite solid solution, thermal expansion increases and scattering increases due to the increase in crystallite sizes. Both effects shall be avoided in the present invention.

DETAILED DESCRIPTION

Figure 1:
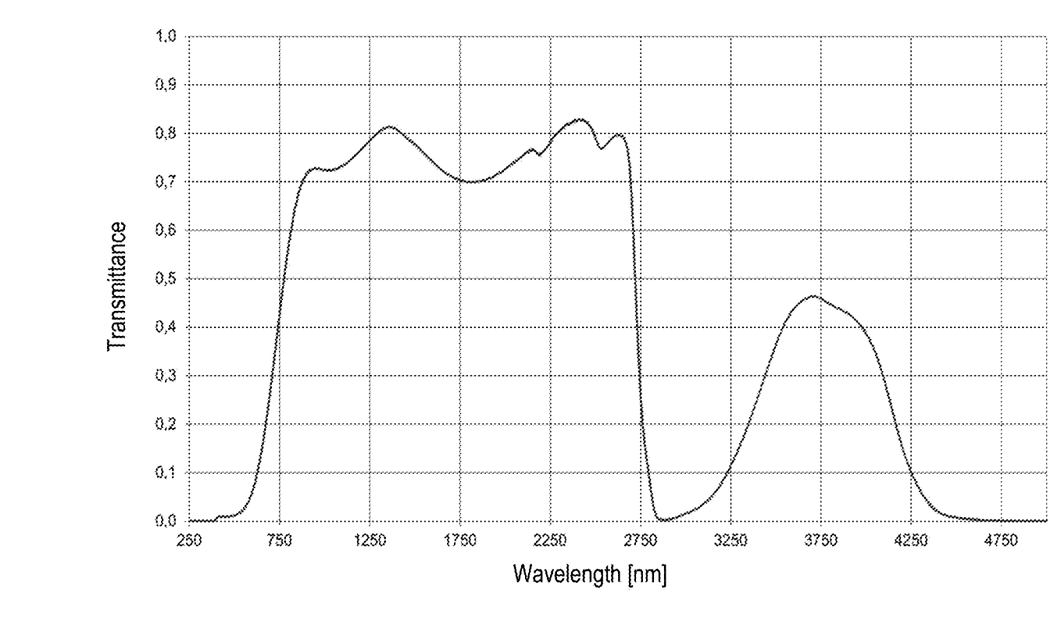
The sole FIGURE shows the spectral transmittance of a sample according to example 12.

The invention will be explained in more detail below by way of exemplary embodiments and with reference to Tables 1 to 5 (each with a and b) and with reference to the sole FIGURE.

Tables 1 to 5 show compositions according to analysis, in percent by weight, and properties, in particular of preferred glass ceramics and related green glasses as examples 1 to 27 in tables 1 to 4 (each with a and b), as well as non-inventive comparative examples C1 to C5 in tables 5a and 5b.

TABLE 1A

EXAMPLES 1 TO 8

| Example | 1 | 2 | 3 | 4 | 5 | 6 | 7 | 8 |
|---|---|---|---|---|---|---|---|---|
| $Li_2O$ | 3.35 | 3.20 | 3.32 | 3.22 | 3.27 | 3.25 | 3.3 | 3.31 |
| $Na_2O$ | 0.44 | 0.270 | 0.33 | 0.20 | 0.21 | 0.28 | 0.29 | 0.29 |
| K2O | 0.44 | 0.64 | 0.32 | 0.66 | 0.23 | 0.31 | 0.35 | 0.35 |
| MgO | 0.66 | 0.31 | 0.50 | 0.31 | 0.77 | 0.52 | 0.59 | 0.59 |
| CaO | 0.47 | 0.41 | 0.21 | 0.34 | 0.30 | 0.71 | 0.61 | 0.61 |
| SrO | | | | | | | | 0.018 |
| BaO | 1.74 | 2.39 | 2.04 | 2.31 | 2.45 | 2.35 | 2.35 | 2.35 |
| ZnO | 1.39 | 1.96 | 1.94 | 1.92 | 1.82 | 1.97 | 2.06 | 2.15 |
| $Al_2O_3$ | 19.80 | 18.50 | 19.20 | 18.50 | 18.40 | 18.60 | 18.70 | 18.60 |
| $SiO_2$ | 66.50 | 67.60 | 67.50 | 67.30 | 67.30 | 66.90 | 66.70 | 66.70 |
| $TiO_2$ | 3.25 | 3.15 | 3.15 | 3.16 | 3.38 | 3.32 | 3.33 | 3.15 |
| $ZrO_2$ | 1.24 | 1.16 | 1.01 | 1.24 | 1.43 | 1.42 | 1.36 | 1.45 |
| $P_2O_5$ | 0.028 | 0.028 | 0.028 | 0.028 | 0.028 | 0.028 | 0.03 | 0.028 |
| $SnO_2$ | 0.250 | 0.240 | 0.240 | 0.250 | 0.250 | 0.250 | 0.250 | 0.250 |
| $Fe_2O_3$ | 0.140 | 0.180 | 0.200 | 0.200 | 0.085 | 0.100 | 0.100 | 0.100 |
| $V_2O_5$ | 0.030 | 0.029 | 0.028 | 0.030 | 0.029 | 0.029 | 0.029 | 0.028 |

TABLE 1A-continued

EXAMPLES 1 TO 8

| Example | 1 | 2 | 3 | 4 | 5 | 6 | 7 | 8 |
|---|---|---|---|---|---|---|---|---|
| $B_2O_3$ | 0.230 | | | | 0.300 | | | |
| Properties, glassy | | | | | | | | |
| $V_A$ (° C.) | 1316 | 1341 | 1332 | 1334 | 1322 | 1322 | 1316 | 1320 |
| T2, 30 (200 dPa · s) | 1666 | 1699 | 1685 | 1692 | 1678 | 1675 | 1669 | 1679 |
| OEG (° C.) | 1226 | 1245 | 1235 | 1235 | 1260 | 1275 | 1280 | N/A |
| $V_A$-OEG (° C.) | 90 | 96 | 97 | 99 | 62 | 47 | 36 | N/A |

TABLE 1B

EXAMPLES 1 TO 8

| Example | 1 | 2 | 3 | 4 | 5 | 6 | 7 | 8 |
|---|---|---|---|---|---|---|---|---|
| Properties, ceramized | | | | | | | | |
| HQ s.s. content (%) | 98.0 | 98.1 | 94.7 | 97.9 | 97.9 | 95.3 | 90.8 | 89.8 |
| HQ s.s. crystallite size (nm) | 42 | 38 | 40 | N/A | N/A | 45 | 47 | 47 |
| K s.s. content (%) | 1.808 | 0.000 | 3.684 | 0.000 | 0.000 | 3.731 | 8.079 | 8.736 |
| K s.s. crystallite size (nm) | N/A | N/A | N/A | N/A | N/A | N/A | 33 | N/A |
| $ZrTiO_4$ content (%) | 0.181 | 0.780 | 0.526 | 0.922 | 0.912 | 0.560 | 0.718 | 1.115 |
| Rutile ($TiO_2$) content (%) | 0.0 | 1.2 | 1.1 | 1.2 | 1.2 | 0.4 | 0.4 | 0.4 |
| $\tau_{vis}$ (%) | 2.2 | 2.4 | 3.3 | 3.0 | 0.7 | 1.1 | 0.7 | 1.0 |
| T(470 nm) (%) | 0.7 | 0.8 | 1.0 | 0.9 | 0.2 | 0.4 | 0.2 | 0.3 |
| T(630 nm) (%) | 6.4 | 6.8 | 9.0 | 8.1 | 2.5 | 3.5 | 2.5 | 3.1 |
| T(950 nm) (%) | 69.6 | 65.3 | 65.2 | 65.0 | 69.6 | 69.2 | 67.2 | 67.6 |
| T(1600 nm) (%) | 73.3 | 70.4 | 67.6 | 67.9 | 80.4 | 78.7 | 78.8 | 78.7 |
| Density (g/ccm) | N/A | N/A | N/A | N/A | N/A | 2.57 | 2.57 | 2.57 |
| $\alpha_{(20-700° C.)}$ (ppm/K) | 0.4 | 0.16 | 0.07 | 0.1 | 0.17 | 0.21 | 0.28 | N/A |

TABLE 2A

EXAMPLES 9 TO 16

| Example | 9 | 10 | 11 | 12 | 13 | 14 | 15 | 16 |
|---|---|---|---|---|---|---|---|---|
| $Li_2O$ | 3.22 | 3.28 | 3.27 | 3.36 | 3.30 | 3.46 | 3.31 | 3.30 |
| $Na_2O$ | 0.35 | 0.32 | 0.31 | 0.36 | 0.35 | 0.42 | 0.33 | 0.42 |
| $K_2O$ | 0.55 | 0.3 | 0.4 | 0.35 | 0.57 | 0.53 | 0.5 | 0.39 |
| MgO | 0.42 | 0.56 | 0.65 | 0.56 | 0.49 | 0.37 | 0.37 | 0.44 |
| CaO | 0.32 | 0.55 | 0.27 | 0.58 | 0.75 | 0.76 | 0.55 | 0.51 |
| SrO | 0.015 | 0.012 | 0.012 | 0.012 | 0.016 | 0.014 | 0.024 | 0.14 |
| BaO | 2.03 | 1.6 | 1.61 | 1.62 | 1.71 | 1.81 | 1.85 | 1.79 |
| ZnO | 1.71 | 1.83 | 2.01 | 1.99 | 2 | 2.01 | 1.92 | 1.95 |
| $Al_2O_3$ | 20.9 | 20.9 | 20.9 | 21.4 | 21.2 | 21.4 | 21.6 | 21.6 |
| $SiO_2$ | 65.4 | 65.6 | 65.5 | 64.8 | 64.6 | 64.2 | 64.4 | 64.5 |
| $TiO_2$ | 3.29 | 3.35 | 3.35 | 3.21 | 3.29 | 3.3 | 3.27 | 3.23 |
| $ZrO_2$ | 1.43 | 1.33 | 1.33 | 1.34 | 1.38 | 1.31 | 1.41 | 1.4 |
| $P_2O_5$ | 0.029 | 0.029 | 0.029 | 0.029 | 0.032 | 0.031 | 0.03 | 0.03 |
| $SnO_2$ | 0.25 | 0.25 | 0.25 | 0.27 | 0.25 | 0.25 | 0.25 | 0.25 |
| $Fe_2O_3$ | 0.1 | 0.1 | 0.1 | 0.099 | 0.099 | 0.1 | 0.099 | 0.1 |
| $V_2O_5$ | 0.03 | 0.028 | 0.03 | 0.028 | 0.028 | 0.027 | 0.026 | 0.027 |
| $B_2O_3$ | 0 | 0 | 0 | 0 | 0 | 0 | 0 | 0 |
| Properties, glassy | | | | | | | | |

TABLE 2A-continued

EXAMPLES 9 TO 16

| Example | 9 | 10 | 11 | 12 | 13 | 14 | 15 | 16 |
|---|---|---|---|---|---|---|---|---|
| $V_A$ (° C.) | 1318 | 1308 | 1310 | 1290 | 1299 | 1281 | 1301 | 1298 |
| T2, 30 (200 dPa·s) | 1665 | 1650 | 1651 | 1639 | 1638 | 1637 | 1650 | 1646 |
| OEG (° C.) | 1290 | 1275 | 1265 | 1270 | 1230 | 1260 | 1325 | 1270 |
| $V_A$-OEG (° C.) | 28 | 33 | 45 | 20 | 69 | 21 | −24 | 28 |

TABLE 2B

EXAMPLES 9 TO 16

| Example | 9 | 10 | 11 | 12 | 13 | 14 | 15 | 16 |
|---|---|---|---|---|---|---|---|---|
| Properties, ceramized | | | | | | | | |
| HQ s.s. content (%) | 99.2 | 99.3 | 99.3 | 98.9 | 99.0 | 99.1 | 98.9 | 98.9 |
| HQ s.s. crystallite size (nm) | 37 | 38 | 36 | 42 | 42 | 42 | 40 | 40 |
| K s.s. content (%) | 0.000 | 0.000 | 0.000 | 0.000 | 0.000 | 0.000 | 0.000 | 0.000 |
| K s.s. crystallite size (nm) | N/A | N/A | N/A | N/A | N/A | N/A | N/A | N/A |
| $ZrTiO_4$ content (%) | 0.787 | 0.717 | 0.714 | 1.116 | 0.987 | 0.865 | 1.141 | 1.101 |
| Rutile ($TiO_2$) content (%) | 0.0 | 0.0 | 0.0 | 0.0 | 0.0 | 0.0 | 0.0 | 0.0 |
| $\tau_{vis}$ (%) | N/A | N/A | N/A | 3.7 | 2.7 | 2.4 | N/A | N/A |
| T(470 nm) (%) | N/A | N/A | N/A | 1.0 | 0.7 | 0.6 | N/A | N/A |
| T(630 nm) (%) | N/A | N/A | N/A | 10.5 | 7.8 | 7.2 | N/A | N/A |
| T(950 nm) (%) | N/A | N/A | N/A | 72.7 | 71.1 | 70.8 | N/A | N/A |
| T(1600 nm) (%) | N/A | N/A | N/A | 74.0 | 74.4 | 74.6 | N/A | N/A |
| Density (g/ccm) | 2.55 | 2.56 | 2.56 | 2.56 | 2.55 | 2.55 | 2.56 | 2.56 |
| $\alpha_{(20\text{-}700°\,C.)}$ (ppm/K) | 0.32 | 0.24 | 0.2 | 0.26 | 0.41 | 0.35 | 0.3 | 0.29 |

TABLE 3A

EXAMPLES 17 TO 21

| Example | 17 | 18 | 19 | 20 | 21 |
|---|---|---|---|---|---|
| $Li_2O$ | 3.29 | 3.27 | 3.29 | 3.31 | 3.30 |
| $Na_2O$ | 0.36 | 0.36 | 0.36 | 0.37 | 0.36 |
| $K_2O$ | 0.36 | 0.36 | 0.35 | 0.36 | 0.36 |
| MgO | 0.55 | 0.56 | 0.56 | 0.56 | 0.56 |
| CaO | 0.59 | 0.58 | 0.59 | 0.58 | 0.58 |
| SrO | 0.012 | 0.012 | 0.013 | 0.013 | 0.012 |
| BaO | 1.62 | 1.62 | 1.63 | 1.62 | 1.63 |
| ZnO | 2.01 | 2.00 | 1.99 | 1.92 | 1.90 |
| $Al_2O_3$ | 21.4 | 21.4 | 21.5 | 21.4 | 21.4 |
| $SiO_2$ | 64.9 | 64.8 | 64.8 | 64.8 | 64.7 |
| $TiO_2$ | 3.23 | 3.22 | 3.16 | 3.2 | 4.02 |
| $ZrO_2$ | 1.34 | 1.33 | 1.34 | 1.35 | 0.68 |
| $P_2O_5$ | 0.029 | 0.029 | 0.022 | 0.035 | 0.03 |
| $SnO_2$ | 0.12 | 0.4 | 0.25 | 0.24 | 0.22 |
| $Fe_2O_3$ | 0.1 | 0.1 | 0.097 | 0.099 | 0.100 |
| $V_2O_5$ | 0.026 | 0.025 | 0.033 | 0 | 0 |
| $MoO_3$ | 0 | 0 | 0 | 0.16 | 0.149 |
| Properties, glassy | | | | | |
| $V_A$ (° C.) | 1301 | 1299 | 1300 | 1300 | N/A |
| T2, 30 (200 dPa·s) | 1595 | 1593 | 1591 | 1645 | N/A |
| OEG (° C.) | 1230 | 1250 | 1265 | 1275 | N/A |
| $V_A$-OEG (° C.) | 71 | 49 | 35 | 25 | N/A |

TABLE 3B

EXAMPLES 17 TO 21

| Example | 17 | 18 | 19 | 20 | 21 |
|---|---|---|---|---|---|
| Properties, ceramized | | | | | |
| HQ s.s. content (%) | N/A | N/A | N/A | N/A | N/A |
| HQ s.s. crystallite size (nm) | N/A | N/A | N/A | N/A | N/A |
| K s.s. content (%) | N/A | N/A | N/A | N/A | N/A |
| K s.s. crystallite size (nm) | N/A | N/A | N/A | N/A | N/A |
| $ZrTiO_4$ content (%) | N/A | N/A | N/A | N/A | N/A |
| Rutile ($TiO_2$) content (%) | N/A | N/A | N/A | N/A | N/A |
| $\tau_{vis}$ (%) | 19.0 | 1.8 | 1.8 | 5.0 | 0.6 |
| T(470 nm) (%) | 8.4 | 0.3 | 0.3 | 5.2 | 0.6 |
| T(630 nm) (%) | 34.6 | 6.1 | 6.1 | 7.0 | 0.96 |
| T(950 nm) (%) | 77.1 | 71.3 | 70.7 | 50.9 | 28.2 |
| T(1600 nm) (%) | 74.9 | 73.9 | 74.4 | 68.1 | 66.13 |
| Density (g/ccm) | 2.56 | 2.56 | 2.56 | 2.56 | N/A |
| $\alpha_{(20\text{-}700°\,C.)}$ (ppm/K) | 0.26 | 0.28 | 0.3 | 0.29 | N/A |

TABLE 4A

EXAMPLES 22 TO 27

| Example | 22 | 23 | 24 | 25 | 26 | 27 |
|---|---|---|---|---|---|---|
| $Li_2O$ | 3.22 | 3.25 | 3.38 | 3.56 | 3.27 | 3.58 |
| $Na_2O$ | 0.78 | 0.76 | 0.20 | 0.76 | 0.38 | 0.48 |
| $K_2O$ | 0.20 | 0.58 | 0.20 | 0.58 | 0.39 | 0.40 |
| MgO | 0.81 | 0.20 | 0.76 | 0.19 | 0.38 | 0.48 |
| CaO | 0.21 | 0.72 | 0.72 | 0.71 | 0.21 | 0.46 |
| SrO | 0 | 0 | 0 | 0 | 0 | 0 |
| BaO | 2.42 | 0.49 | 2.43 | 0.490 | 0.49 | 1.42 |
| ZnO | 1.16 | 0.90 | 1.25 | 1.26 | 1.96 | 1.40 |
| $Al_2O_3$ | 19.8 | 22.9 | 22.4 | 22.6 | 22.4 | 21.1 |
| $SiO_2$ | 66.9 | 65.6 | 63.8 | 64.8 | 65.9 | 65.6 |
| $TiO_2$ | 2.68 | 3.45 | 2.69 | 4.08 | 3.15 | 3.57 |
| $ZrO_2$ | 1.44 | 0.65 | 1.55 | 0.43 | 1.14 | 1.05 |
| $P_2O_5$ | 0 | 0 | 0 | 0 | 0 | 0 |
| $SnO_2$ | 0.20 | 0.19 | 0.38 | 0.39 | 0.19 | 0.29 |
| $Fe_2O_3$ | 0.11 | 0.15 | 0.03 | 0.031 | 0.064 | 0.095 |
| $V_2O_5$ | 0 | 0 | 0 | 0 | 0 | 0 |
| $MoO_3$ | 0.043 | 0.15 | 0.084 | 0.083 | 0.058 | 0.080 |
| Properties, glassy | | | | | | |
| $V_A$ (° C.) | 1331 | N/A | 1295 | 1299 | 1313 | 1305 |
| T2, 30 (200 dPa · s) | N/A | N/A | N/A | N/A | N/A | N/A |
| OEG (° C.) | 1260 | N/A | 1310 | 1305 | N/A | 1230 |
| $V_A$-OEG (° C.) | 71 | N/A | -15 | -6 | N/A | 75 |

TABLE 4B

EXAMPLES 21 TO 27

| Example | 22 | 23 | 24 | 25 | 26 | 27 |
|---|---|---|---|---|---|---|
| Properties, ceramized | | | | | | |
| HQ s.s. content (%) | N/A | N/A | N/A | N/A | N/A | N/A |
| HQ s.s. crystallite size (nm) | 43 | 73 | 53 | 60 | 70 | 42 |
| K s.s. content (%) | N/A | N/A | N/A | N/A | N/A | N/A |
| K s.s. crystallite size (nm) | N/A | N/A | N/A | N/A | N/A | N/A |
| $ZrTiO_4$ content (%) | 1.1 | N/A | 0.9 | N/A | 0.7 | N/A |
| Rutile ($TiO_2$) content (%) | N/A | N/A | N/A | N/A | N/A | 0.6 |
| $\tau_{vis}$ (%) | 38.5 | 1.4 | 28.2 | 4.3 | 10.8 | 0.9 |
| T(470 nm) (%) | 33.2 | 0.6 | 23.7 | 2.4 | 5.2 | 1.6 |
| T(630 nm) (%) | 46.1 | 3.4 | 35.7 | 6.7 | 17.6 | 0.9 |
| T(950 nm) (%) | 71.6 | 17.2 | 75.4 | 42.5 | 61.8 | 26.0 |
| T(1600 nm) (%) | 72.3 | 25.4 | 84.2 | 78.3 | 76.7 | 65.9 |
| Density (g/ccm) | 2.54 | 2.49 | 2.56 | 2.50 | 2.52 | 2.54 |
| $\alpha_{(20-700°\ C.)}$ (ppm/K) | 0.59 | 0.44 | 0.44 | 0.42 | -0.23 | 0.26 |

TABLE 5A

COMPARATIVE EXAMPLES C1 TO C5

| Comparative example | C1 | C2 | C3 | C4 | C5 |
|---|---|---|---|---|---|
| $Li_2O$ | 3.63 | 2.92 | 3.80 | 2.93 | 3.50 |
| $Na_2O$ | 0.20 | 0.68 | 0.20 | 0.18 | 0.39 |
| $K_2O$ | 0.20 | 0.20 | 0.67 | 0.20 | 0.39 |
| MgO | 1.09 | 1.11 | 0.19 | 1.11 | 1.11 |
| CaO | 0.42 | 0.52 | 0.41 | 0.21 | 0.21 |
| SrO | 0 | 0 | 0 | 0 | 0 |
| BaO | 0.98 | 2.43 | 0.97 | 2.43 | 2.42 |
| ZnO | 1.84 | 1.82 | 1.61 | 1.83 | 1.25 |
| $Al_2O_3$ | 18.30 | 18.30 | 21.40 | 21.00 | 20.80 |
| $SiO_2$ | 68.40 | 66.50 | 65.40 | 65.00 | 64.40 |
| $TiO_2$ | 3.56 | 2.97 | 3.35 | 3.06 | 3.56 |
| $ZrO_2$ | 0.93 | 1.53 | 1.03 | 1.28 | 0.94 |
| $P_2O_5$ | 0.03 | 0.028 | 0.029 | 0.027 | 0.029 |
| $SnO_2$ | 0.240 | 0.250 | 0.250 | 0.250 | 0.250 |
| $Fe_2O_3$ | 0.200 | 0.200 | 0.200 | 0.079 | 0.200 |
| $V_2O_5$ | 0.029 | 0.030 | 0.028 | 0.028 | 0.030 |
| $B_2O_3$ | 0.000 | 0.450 | 0.440 | 0.440 | 0.460 |
| Properties, glassy | | | | | |
| $V_A$ (° C.) | 1307 | 1308 | 1297 | 1300 | 1281 |
| T2, 30 (200 dPa · s) | 1666 | 1660 | 1638 | 1638 | 1621 |
| OEG (° C.) | N/A | N/A | N/A | N/A | N/A |
| $V_A$-OEG (° C.) | N/A | N/A | N/A | N/A | N/A |

TABLE 5B

COMPARATIVE EXAMPLES V1 TO V5

| Comparative example | C1 | C2 | C3 | C4 | C5 |
|---|---|---|---|---|---|
| Properties, ceramized | | | | | |
| HQ s.s. content (%) | 0.0 | 9.6 | 98.5 | 99.1 | 97.1 |
| HQ s.s. crystallite size (nm) | N/A | 34 | 93 | 48 | 40 |
| K s.s. content (%) | 97.709 | 88.554 | 1.303 | 0.000 | 2.004 |
| K s.s. crystallite size (nm) | 74 | 74 | N/A | N/A | N/A |
| $ZrTiO_4$ content (%) | 0.687 | 1.506 | 0.163 | 0.887 | 0.911 |
| Rutile ($TiO_2$) content (%) | 1.6 | 0.3 | 0.0 | 0.0 | 0.0 |
| $\tau_{vis}$ (%) | 0.1 | 1.1 | 8.4 | 4.6 | 1.6 |
| T(470 nm) (%) | 0.0 | 0.3 | 3.3 | 1.6 | 0.4 |
| T(630 nm) (%) | 0.3 | 3.5 | 18.3 | 11.9 | 4.8 |
| T(950 nm) (%) | 44.1 | 56.6 | 69.7 | 77.5 | 61.7 |
| T(1600 nm) (%) | 67.9 | 67.7 | 67.7 | 80.2 | 67.4 |
| Density (g/ccm) | N/A | N/A | N/A | N/A | N/A |
| $\alpha_{(20-700°\ C.)}$ (ppm/K) | 0.93 | 1.51 | -0.15 | 0.61 | 0.91 |

The constituents of the starting glasses shown in Tables 1 to 5, which is the composition in percent by weight according to analysis, were melted at 1600 to 1650° C. for 4 hours in sintered silica glass crucibles. Subsequently, they were poured into silica glass crucibles, at 1550 to 1580° C., and homogenized for 30 minutes, by stirring. Refining with tin oxide was performed at 1620 to 1640° C. for 2 hours.

The glasses were cast into castings which were slowly cooled in a lehr, from a temperature of about 20° C. below the transformation temperature ($T_g$) to room temperature.

Some of the castings were used to determine the glassy properties. The processing temperature ($V_a$) at a viscosity of $10^4$ dPa·s and the temperature corresponding to a viscosity of 200 dPa·s were determined. In some cases, the upper devitrification temperature (OEG) was determined after 5 hours in Pt contact.

The abbreviation N/A as used in the tables means that these data have not been determined.

In addition, samples for the measurements of the glass ceramic properties were produced from the castings and ceramized.

The following temperature-time profile was used as a ceramization program:
a) rapid heating from room temperature to 740° C. within 26 minutes;
b) temperature increase from 740 to 825° C. within 18 minutes (heating rate of 4.7° C./min);
c) temperature increase from 825° C. to 930° C. within 4 minutes (heating rate of 26° C./min), holding time of 4 minutes at the maximum temperature of 930° C.;

d) cooling to 800° C. within 16 minutes, then rapid cooling to room temperature.

The ceramized samples were subjected to an XRD measurement to determine the crystal phases and crystallite sizes using Rietveld analysis.

Since determination of the amorphous phase is subject to considerable uncertainty, the crystal phase fractions indicated in the tables are based on the total crystal phase content of the glass ceramic.

Transmittance was determined on samples with a thickness of 3 to 4 mm and converted to a thickness of 4 mm for better comparability. Light transmittance ($\tau_{vis}$) as measured according to DIN EN 410 is listed in the tables.

Thermal expansion (a) was measured in a range from 20° C. to 700° C.

The density in the ceramized state was also determined on some samples.

Examples 1 to 27 as shown in tables 1a and 1b, in tables 2a and 2b, and in tables 3a and 3b and 4a and 4b are examples of glass ceramics according to the invention, and the examples C1 to C5 shown in tables 5a and 5b are non-inventive comparative examples.

The glass ceramics of the invention according to examples 1 through 27 have processing temperatures ($V_A$) between 1281° C. and 1341° C. The upper devitrification temperature (OEG) is between 1226° C. and 1325° C.

By a suitable selection of the composition it is possible to obtain particularly devitrification-stable green glass melts, that is to say melts exhibiting a particularly large margin between the processing temperature and the upper devitrification temperature (VA-OEG). This may be necessary depending on the requirements of the selected hot forming process.

The temperatures at which the green glass melts have a viscosity of 200 dPa·s range between 1591° C. and 1699° C. in the examples according to the invention.

All green glass melts in the examples according to the invention include, after the ceramization described above, high quartz (HQ s.s.) as the main crystal phase, generally with more than 90% of the total crystal phase fraction. Other crystal phases are keatite solid solution (K s.s.) and the nucleation agent phases $ZrTiO_4$ and rutile ($TiO_2$). At the same time, crystallite sizes are so small, with 33 nm to 73 nm, that no disturbing scattering occurs when display elements are used below the glass ceramic.

Light transmittance ($\tau_{vis}$), converted to 4 mm thickness, is between 0.6 and 38.5% in the exemplary embodiments.

The sole FIGURE shows the spectral transmittance of the inventive sample according to example 12.

The sample of example 12 exhibits a transmittance of 74% in the infrared (1600 nm). At 470 nm, transmittance of the glass ceramic is 1.0%, and at all wavelengths above it is greater than this value, so that good display capability for colored LEDs is given.

Light transmittance ($\tau_{vis}$) of the glass ceramic of example 12 is 3.7%.

Example 17 exhibits higher transmittance in the visible range of almost 20% (Table 3b). This can be advantageous if an underside coating is to be used or display elements are to be mounted below the glass ceramic.

Example 19 was melted with more cost-efficient technical raw materials. Thereby, impurities of 0.0041 percent by weight of $Cr_2O_3$ were introduced, and 0.3232 percent by weight of Rh was introduced through crucible contact. As can be seen from the properties listed in Tables 3a and 3b, the desired utility properties for glass ceramic cooking surfaces are nevertheless achieved.

Example 20 illustrates the coloring using $MoO_3$. The composition contains 0.16% of $MoO_3$ (Table 3a) and has a light transmittance ($\tau_{vis}$) of 5% when ceramized (Table 3b).

Further examples for coloring with $MoO_3$ are listed in Tables 4a and 4b. Light transmittances ($\tau_{vis}$) of the $MoO_3$-colored examples are likewise in a range from 0.6% to 38.5%. Higher and lower light transmittances can also be adjusted by adjusting the composition accordingly.

The glass ceramics according to the exemplary embodiments have a thermal expansion ($\alpha$) of 0.07 to 0.59 ppm/K in the range from 20 to 700° C. (Tables 1b, 2b, and 3b), which meets the requirements for temperature-stable cooking surfaces.

The non-inventive comparative examples C1 to C5 in table 5a illustrate the choice of composition ranges.

Comparative Examples C1 and C2 contain excessively high contents of MgO (Table 5a). Both have keatite solid solution (K s.s.) as the main crystal phase and correspondingly high thermal expansions ($\alpha$), as shown in Table 5b. This is also due to the excessively high $SiO_2$ content in comparative example C1 and the insufficient $Li_2O$ content in C2 (Table 5a).

Comparative Example C3 has a lithium content of 3.8% (Table 5a). Although the glass ceramic exhibits good properties, it implies higher raw material costs due to the high lithium content and therefore no advantage over the known prior art.

Compared to the glass ceramics of the invention, comparative Example C4 also has an excessively high MgO content, with 1.11 wt %, and an insufficient $Li_2O$ content, as can be seen in Table 5a, so that thermal expansion between 20° C. and 700° C. increases to 0.6 ppm/K (Table 5a).

Comparative Example C5 shows the adverse effect of an excessively high MgO content (Table 5a) on thermal expansion, which increases to 0.91 ppm/K in example C5 (Table 5b).

What is claimed is:

1. A method for producing a glass ceramic, comprising:
   providing raw material components that comprise 3.0 to 3.6 percent by weight of lithium oxide ($Li_2O$) and a colorant comprising molybdenum oxide ($MoO_3$);
   melting the raw material components to provide a green glass melt;
   refining the green glass melt;
   hot forming the green glass melt into a glass ceramic panel; and
   ceramizing so that the glass ceramic panel has a transmission of equal to or more than 45% and equal to or less than 85% at a wavelength of 1600 nm.

2. The method of claim 1, wherein the step of providing the raw material components comprises providing 0.003 to 0.25 percent by weight of molybdenum oxide ($MoO_3$).

3. The method of claim 2, wherein the step of providing the raw material components comprises providing 0.003 to 0.05 percent by weight of vanadium oxide ($V_2O_5$).

4. The method of claim 1, wherein the step of providing the raw material components comprises providing vanadium oxide ($V_2O_5$).

5. The method of claim 1, wherein the step of ceramizing the panel provides that high-quartz solid solution is a main crystal phase and so that a glass ceramic panel is provided with a thermal expansion of −1 to +1 ppm/K in a range from 20° C. to 700° C.

6. The method of claim 1, wherein the step of melting comprises melting the raw material components at a temperature from 1500 to 1700° C. to provide the green glass melt.

7. The method of claim 1, wherein the step of hot forming comprises hot forming the green glass melt at a viscosity of 104 dPa·s and at a temperature of less than 1350° C.

8. The method of claim 7, wherein the step of hot forming further comprises maintaining a margin between the temperature and an upper devitrification temperature is between 20 and 100° C.

9. The method of claim 1, wherein the glass ceramic panel is a transparent colored LAS glass ceramic panel.

10. The method of claim 1, wherein the step of providing the raw material components comprises providing a coloring oxide in an amount from 0 to less than 0.01 percent by weight, the coloring oxide selected from a group consisting of CoO, NiO, $Cr_2O_3$, CuO, $Nd_2O_3$, and combinations thereof.

11. The method of claim 1, wherein the step of providing the raw material components comprises providing 0.1 to 0.6 percent by weight of tin oxide ($SnO_2$).

12. The method of claim 4, wherein the step of providing the raw material components comprises providing 0.03 to 0.05 percent by weight of vanadium oxide ($V_2O_5$).

13. The method of claim 1, wherein the step of providing the raw material components comprises providing 3.2 to 3.6 in percent by weight of lithium oxide ($Li_2O$).

14. The method of claim 1, wherein the step of providing the raw material components comprises providing a compound selected from a group consisting of arsenic (As), antimony (Sb), cadmium (Cd), lead (Pb), halides, sulfur (S) in an amount from 0 to less than 0.5 percent by weight.

15. The method of claim 14, wherein the amount is less than 0.05 percent by weight.

16. The method of claim 5, wherein the high-quartz solid solution accounts for more than 80% of existing crystal phases and wherein further crystal phases, only nucleation phases or keatite solid solution (K s.s.), account for an amount of not more than 20% of the crystal phase fraction.

17. The method of claim 1, wherein the step of ceramizing comprises ceramizing so that the glass ceramic panel is provided with a light transmittance from 0.5% to 70% at a thickness of 4 mm.

18. The method of claim 1, wherein, during the step of refining, the green glass melt has a viscosity of 200 dPa·s at less than 1750° C.

19. The method of claim 1, wherein the step of ceramizing comprises ceramizing the panel so that the thermal expansion is 0 to 0.41 ppm/K in the range from 20° C. to 700° C.

* * * * *